United States Patent [19]

Smock

[11] Patent Number: 4,974,987
[45] Date of Patent: Dec. 4, 1990

[54] LOCKING DEVICES FOR EXHIBIT FRAMEWORK SYSTEMS

[75] Inventor: Dennis J. Smock, Nashville, Tenn.
[73] Assignee: Matrix Exhibits, Inc., Lavergne, Tenn.
[21] Appl. No.: 376,043
[22] Filed: Jul. 6, 1989
[51] Int. Cl.⁵ ............................................. F16B 9/02
[52] U.S. Cl. .................................. 403/252; 403/255; 403/322
[58] Field of Search ............... 403/252, 255, 254, 257, 403/322, 264, 190

[56] References Cited

U.S. PATENT DOCUMENTS

| | | |
|---|---|---|
| 3,574,367 | 4/1971 | Jankowski . |
| 4,345,849 | 8/1982 | Stenemann . |
| 4,455,103 | 6/1984 | Hackenberg . |
| 4,583,359 | 4/1986 | Staeger . |
| 4,690,582 | 9/1987 | Maier et al. .......................... 403/252 |
| 4,787,769 | 11/1988 | Michael ............................... 403/252 |
| 4,799,819 | 1/1989 | Swoboda ............................. 403/252 |

Primary Examiner—Peter M. Cuomo
Attorney, Agent, or Firm—Mason, Fenwick & Lawrence

[57] ABSTRACT

A locking device for assembling tubular frame components of exhibit framework structures and the like, including an elongated box-like housing sized to be received in a cavity of one of the frame components, the housing having an open coupling end provided with protruding spaced apart coupling ear formations integral with the housing adjacent top and bottom walls thereof and flanking the opening of said coupling end. An elongated thin spring-metal interlocking latching member is movable in the housing by a cam and has a recurved hook formation on one end thereof spanning the space between and aligned with the ear formations. An intermediate bend portion of the latch-member slidably bears against a sidewall of the housing and an integral spring leg extends angularly therefrom in inclined relation to and seated in a slot in an opposite sidewall of the housing for subjecting the bend and leg portions to tensile bending moments flexibly distorting the latching member to displace the hook formation laterally between latching and unlatching relation to an undercut recess in another of the frame components.

10 Claims, 2 Drawing Sheets

LOCKING DEVICES FOR EXHIBIT FRAMEWORK SYSTEMS

BACKGROUND AND OBJECTS OF THE INVENTION

The present invention relates in general to locking devices for tubular framework structures of special cross-sectional configuration to provide framework structures for exhibits, fairs and the like which can be readily assembled and dismantled.

Heretofore, it has become a popular practice to assemble tubular framework members of special sectional configuration, frequently referred to as profile bars, with various types of coupling devices or fastening means to form exhibit skeleton framework structures. The profile bars or elongated framework sections having a special exterior contour, are generally of hollow octagonal configuration defining a substantially cylindrical, centrally disposed elongated cavity which extends the length of the section and is of relatively small diameter compared to the external diameter of the tubular section. Plural truncated triangular undercut recesses or chambers are disposed at circumferentially spaced locations about the tube and have slots opening to the exterior providing longitudinal slots bounded by shoulder formations or flanges, adapted to receive coupling elements projecting from tie bars into the sockets. Examples of such octagonal tubular framework sections are disclosed in prior U.S. Pat. No. 4,583,359 or U.S. Pat. No. 4,455,103 showing such framework sections in conjunction with a special coupling device or holding member adapted to be inserted into the ends of rectangular tubular tie bars and having a cam operated projecting tongue formation to be received in the clamping recesses of the octagonal tube section for connecting elements together in a rigid framework.

The connecting device of the prior U.S. Pat. No. 4,455,103, which is typical of the type of coupling devices heretofore used to interconnect the framework elements, is described as comprising a bearing housing having an eccentric controlling disc located in the holding member and a resilient tongue member formed from a sheet metal strip having a front end coupling hook and a rear end control portion to be acted upon by the eccentric disc. The tongue member is referred to as a holding member having a matching inclined surface which is forced against an upwardly oriented wedge surface of the bearing housing by movement of the holding member in a longitudinal direction by the eccentric disc arranged transversely to the bearing housing of the coupling device. It is stated that the coupling hook formation on the end of the holding member is movable both longitudinally relative to stationary projections of the bearing housing as well as laterally due to the rising movement of the matching inclined surface along the wedge surface to achieve proper movement of the resilient tongue formation on the end of the sheet metal member to coupled and decoupled relation with the holding surfaces of the recess of the profile bar confronting and aligned with the holding device.

An object of the present invention is the provision of a locking device for rapid assembly and disassembly of skeleton framework components, such as tie bars and profile bars, to form a framework system for exhibits, fairs and similar display applications, wherein the locking device is formed of three components which can be readily and simply produced in a manner which reduces production expenses and still preserves reliability and ease of operation of the locking device in achieving desired interlocking and release relative to the frame components of the framework system.

A further object of the present invention is the provision of a locking device as described in the immediately preceding paragraph, wherein the components are shaped and assembled in such a way that a movable spring steel latching or clip member having the projecting catch formation to be entered into holding relation in an interlocking recess of the framework or similar member is fulcrumed in the housing portion in a manner causing it to be canted or pivoted laterally by tensile bending movements to projected or holding position so that the clip will distort in shape in a way causing it to enter into holding relation in the associated clamping recess of the profile bar.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a perspective view of the locking device of the present invention shown adjacent a profile bar octagonal pole, shown in broken lines, of the type customarily used in framework systems for exhibits, displays and the like;

DETAILED DESCRIPTION OF A PREFERRED EMBODIMENT

Figure 5:
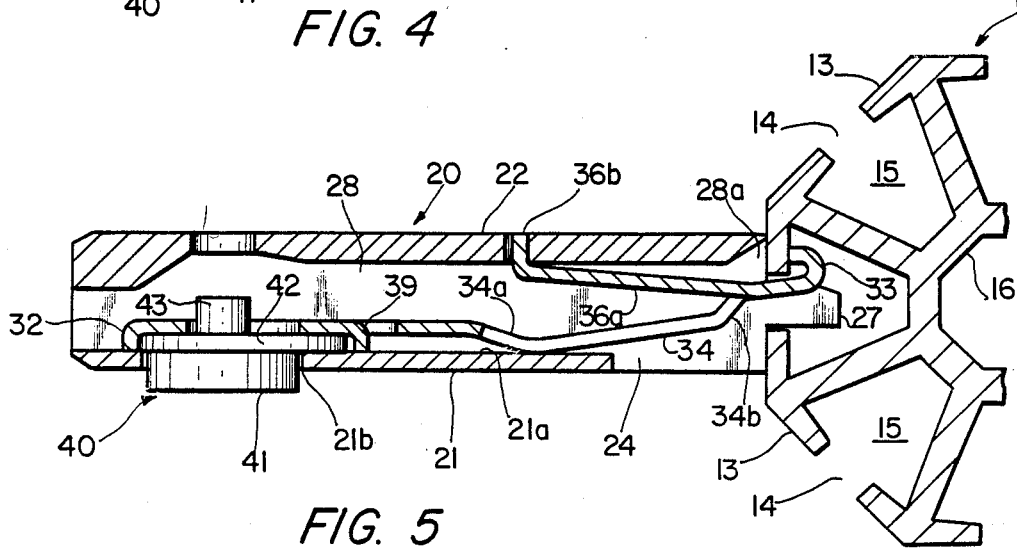
FIG. 5 is a section view similar to FIG. 4, but showing the locking device in locked position interlocked with the associated profile bar pull.

Referring to the drawings, wherein like reference characters designate corresponding parts throughout the several figures, the framework locking device of the present invention, indicated generally by the reference character 10, is designed to cooperate with conventional slotted octagonal framework poles, as indicated generally at 12, of the type commonly used for exhibit display skeleton framework structure and the like. For example, such octaganol poles typically have an interrupted outer tubular wall defining eight flat interrupted planiform faces 13 provided with elongated longitudinal slots 14, which are elongated longitudinally of pole, forming entrance openings to longitudinal elongated truncated triangular cross-section interlock recesses or chambers 15. Such a special cross-section conventional exhibit framework poles typically include an octagonal tubular inner wall 16 bounding a central opening, and having radial webs 17 extending therefrom to join the corners or transverse lateral edges of the interrupted faces 13, as illustrated in FIG. 5.

Figure 1:
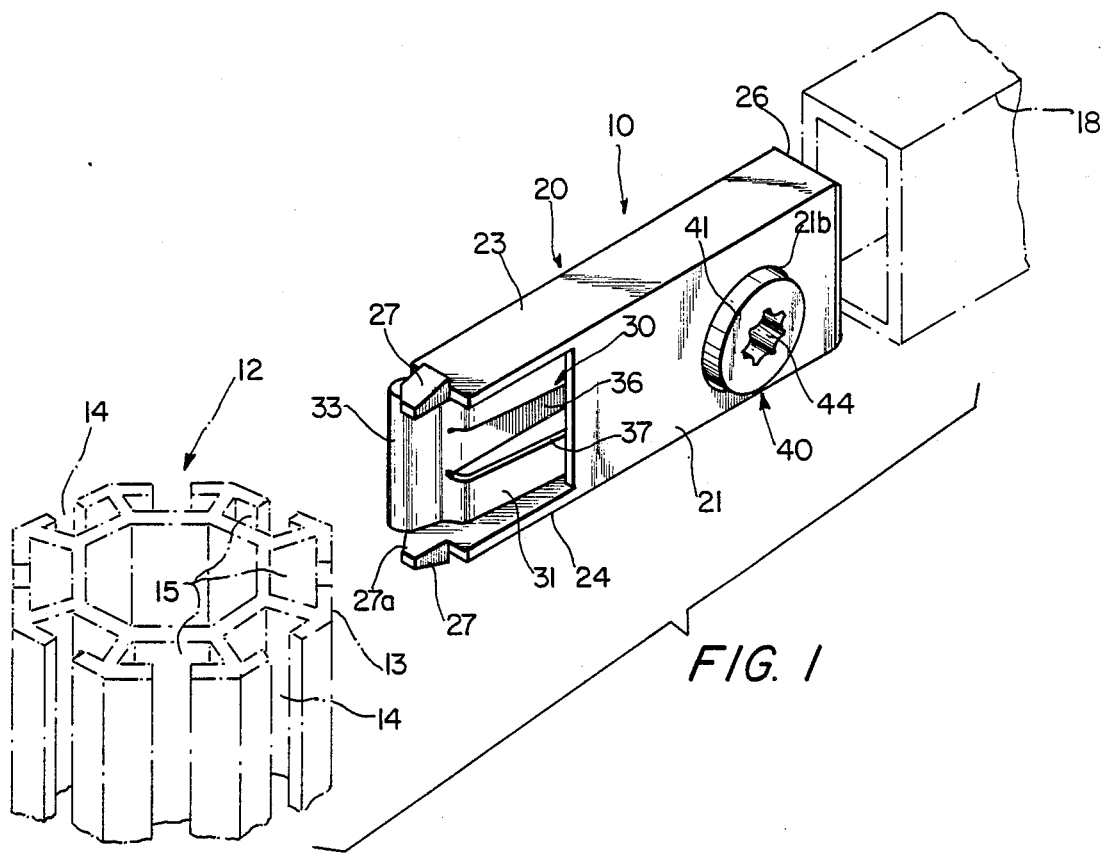
Figure 2:
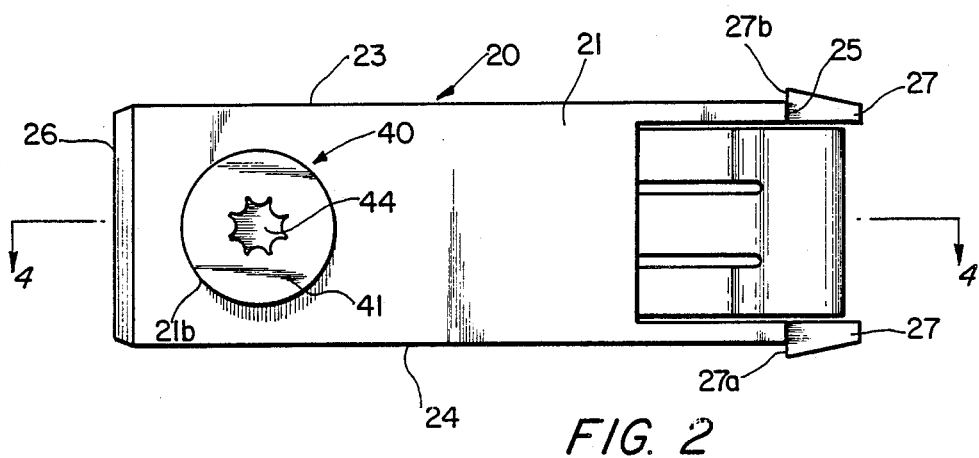
FIG. 2 is a front elevational view thereof.
Figure 6:
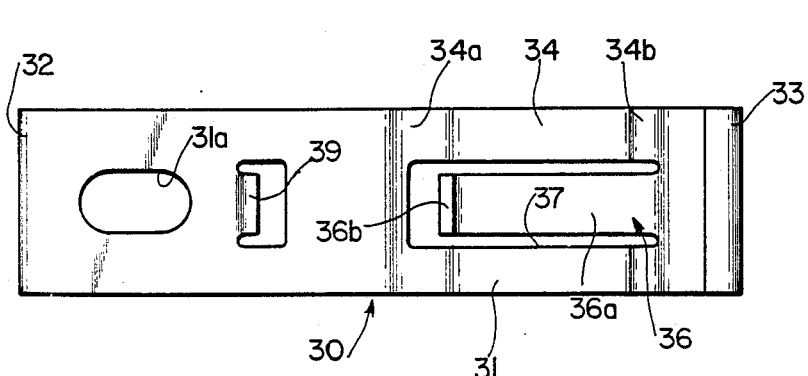
FIG. 6 is a front elevational view of the movable spring clip component of the lock assembly.
Figure 7:
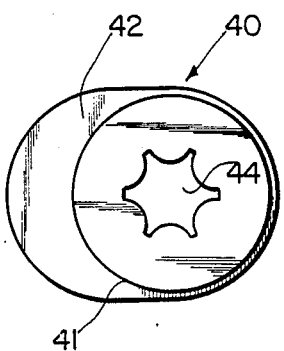
FIG. 7 is an elevational view of the control cam for operating the spring clip component, showing the opposite side from that shown in FIG. 3.
Figure 3:
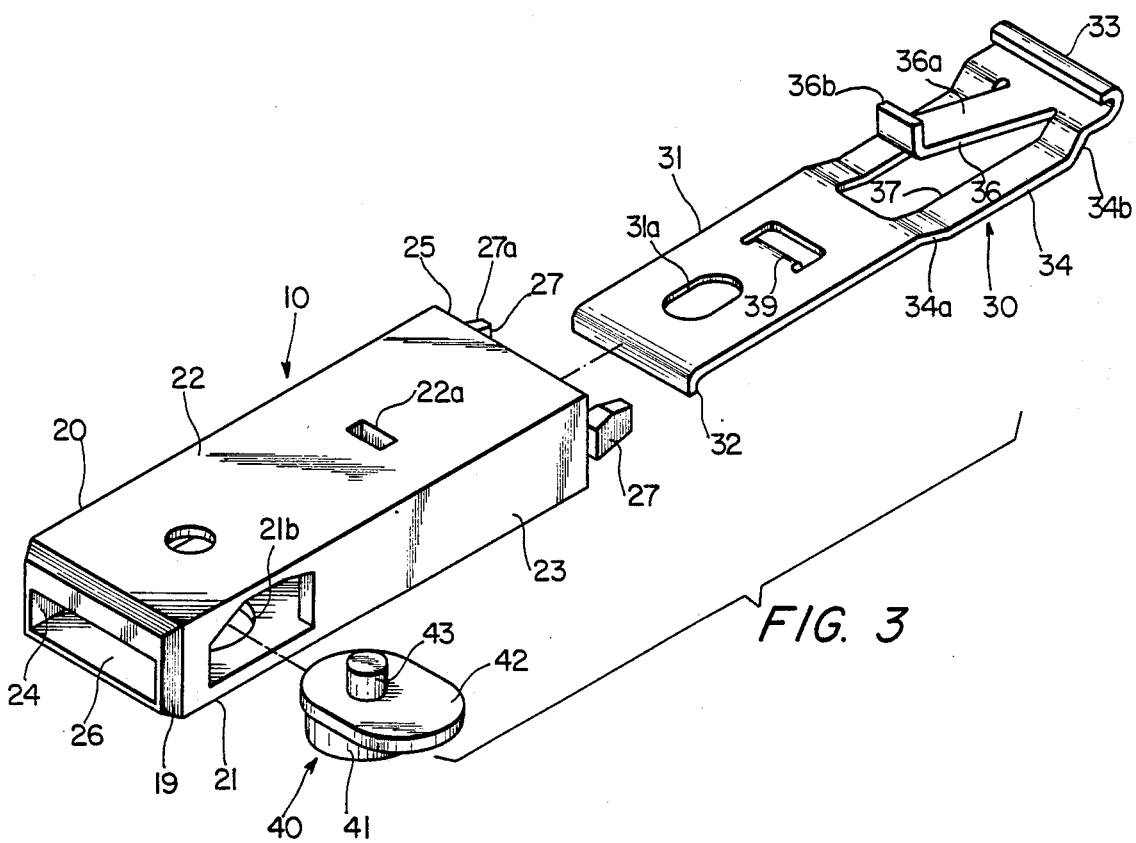
FIG. 3 is an exploded perspective view of the locking device of the present invention.

The locking device 10 of the present invention includes a generally rectangular or box-like lock housing 20 having flat front and rear walls 21, 22, top and bottom walls 23 and 24, a coupling or proximal end 25 and an opposite distal end 26. The housing is provided adjacent the upper and lower limits of the coupling end 25, as integrally extension of the top and bottom walls 23, 24, with a pair of fixed, vertically spaced coupling protrusions or ear formations 27 which are tapered or beveled near their outermost or leading ends, as indicated at 27a, to facilitate their insertion into the slots 14 of the pole 12. They are provided with limit shoulders 27b which extend respectively above and below the top and bottom walls 23, 24, respectively of the lock housing 20, as best shown in FIG. 2, to limit insertion of the main body portion of the elongated lock housing 20 into a conventional tie bar, as indicated at 18, of the type typically provided for interconnecting the vertical poles in such an exhibit or display framework. In the illustrated example, the tie bars may be of rectangular cross-sectional configuration having a rectangular cross-sectioned hollow center which conforms substantially to the rectangular cross-section defined by the outer surfaces of the front, rear, top and bottom walls 21–24 of the lock housing 20. Typically, the distal end portions of these lock housing walls 21–24 are beveled as indicated at 19 to facilitate insertion into the hollow of the tie bar 18.

Supported within the hollow interior chamber of the lock housing 20 is a spring steel interlocking slide member or clip 30 having an elongated substantially rectangular, panel-like main body 31 terminating near the distal end 26 of the lock housing with the forwardly turned end flange lip 32 which slides against the flat confronting inner face 21a of the front housing wall 21. The slide member 30 has a recurved hook end formation 33 at its coupling end protruding through the open end of the housing 20 at the coupling end 25 thereof where the interior chamber 28 opens through the end 25, as indicated at 28a. The recurved hook end formation of the interlocking spring latching member or clip 30 lies in the space between the two vertically spaced coupling protrusions or ears 27 substantially completely spanning the vertical space therebetween, and is tiltable from the unlocked position wherein the hook formation 33 is vertically aligned with the flanking coupling protrusion or ears 27, to an interlocking position as illustrated in FIG. 5 wherein the hook formation 33 is canted rearwardly about a fulcrum point intermediate the distal and proximal ends of the housing 20 to a laterally displaced position relative to the fixed coupling protrusions or ears 27.

In the region of the innerlocking spring latching member 30 lying between the longitudinal mid-region of the elongated lock housing 20 and the proximal or coupling end 25 thereof is a laterally offset land or bearing formation 34 formed by bends 34a and 34b in the spring metal clip so that the forwardly facing surface of the land 34, at least in the portion thereof adjacent the bends 34a, slidably bears against the face 21a of the lock housing front wall 21. A rearwardly inclined integral leaf spring formation 36 is formed by a U-shape cut-out 37 in the land portion of the spring steel latching member 30 to define a spring leg 36a inclining rearwardly from its root juncture with the clip body 31 adjacent the bend 34b and terminating in a fulcrum-forming lip or tab 36b at its rearmost end interfitted loosely into a slot 22a in the rear wall of the lock housing 20. A cam 40 is provided for operating the locking device to shift the spring steel latching member 30 between locking and unlocking positions. The cam 40 comprises a larger diameter cylindrical hub portion 41 extending through and journaled in a circular opening 21b of the lock housing front wall 21 for rotation about an axis forming the center line of both the cylindrical hub portion 41 and the circular opening 21a, and has an eccentric oval or generally elliptical cam portion 42 located within the chamber defined by the lock housing immediately inwardly adjacent the inner surface 21a of the front wall 21, to rotate against the front wall inner face 21a and be captured between the face 21a and the confronting face of the spring steel latching member or clip 30 as shown. The spring steel latching member 30 also has an intermediate retaining lip or flange formation 39 which forms, coactively with the end flange or lip 32, cam follower formations abutted by the periphery of the eccentric or oval cam portion 42. A smaller diameter second hub portion 43 also forms part of the cam 40 and lies inwardly of the eccentric or oval cam portion 42, protruding through a longitudinally elongated slot therefor, indicated at 31s in the drawings, which accommodates a predetermined amount of longitudinal displacement of the main body portion 31 of the spring steel latching member or clip 30 under the action of the cam formation 42 of the cam 40. The larger hub formation 41 of the cam 42 protrudes through the opening 21b in the housing front wall 21 to an exposed position and has a forwardly facing socket formation of non-round configuration, indicated at 44, for receipt of a tool or bit of appropriate configuration to rotate the cam about the center axis of the hub portions 41 and 43.

Figure 4:
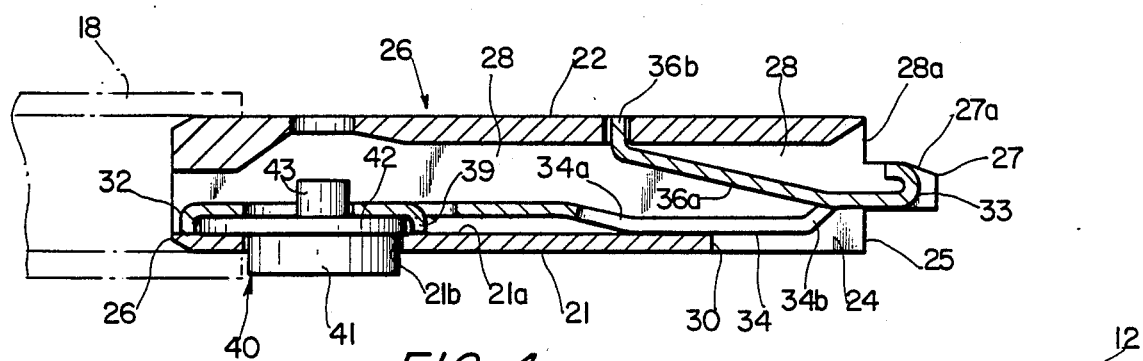
FIG. 4 is a horizontal longitudinal section view taken along the line 4—4 of FIG. 2, showing the locking device in unlocked position.

Referring particularly to FIGS. 4 and 5, the cam 40 when the locking device is in the unlocking or uncoupling position is disposed with the eccentrically protruding region of the cam portion 42 directed toward the distal or anterior end 26 of the locking housing, positioning the spring steel latching member or clip 30 as shown in FIG. 4 so that the flat portions of the main body 31 are disposed parallel to the longitudinal axis of the housing 20 and to the confronting face 21a of the housing front wall 21, wherein the spring steel latching member is in substantially unstressed condition positioning the hook formation 33 in vertical alignment with and withdrawn into the zone between the two vertically spaced coupling protrusion ears 27 as shown. In this position, the hook formation 33 lies within the profile of the coupling protrusion or ears 27 as will be apparent from FIG. 4. Upon insertion of an appropriate activating tool or bit into the socket 44 in the cam 40 and rotation of the cam through 180°, the interaction of the eccentric cam portion 42 with the cam follower formations defined by the end flange 32 and intermediate flange formation 39 cause the adjacent portions of the spring steel latching member or clip 30 lying rearwardly of the bend 34a to be displaced forwardly toward the coupling end 25 of the locking device housing 20, but since forward or endwise movement of the hook end portion 33 of the latching member or clip is restrained by the fulcrum forming lip or tab 36b interfitted in the opening 22a of the lock housing, a tensile bending moment is applied to the spring steel clip effectively pivoting the portions of the latching member or clip adjacent the hook end portion 33 about the fulcrum defined at 36b, which cants the hook end portion of the latching member or clip toward the rear to a locking position displaced laterally or rearwardly as viewed in FIG. 5 from the zone defined by the profiled of the stationary coupling protrusion or ears 27. Thus, with the locking device inserted in the hollow interior of a tie bar sized to receive the locking device and having an access opening for operation of the cam 40, the tie bar can be assembled to the slotted profiled pole such as the pole 12 by inserting the coupling protrusion or ear formations 27 and the recurved hook end portion 33 aligned therebetween through the elongated entrance slot 14 in the outer wall of the pole at the desired position, and insertion of an operating tool or bit into the cam socket 40 and rotation of the cam through 180° from the unlocked position. This effects canting of the hook end formation 33 and adjacent portions of the spring steel latching member or clip, tilting or pivoting the same generally about the fulcrum axis defined at the fulcrum-forming lip or tab 36b to displace the hook formation 33 to rearwardly protruding relation relative to the fixed coupling protrusions or ears 27 to latch behind the portions 15 defining the restraining shoulder formations laterally bounding the slots 14 and thus interlock the locking device 10, and the tie bar or other framework member with which the locking device is associated to the slotted pole framework member. It will be understood that the framework members can be similarly disassembled by using the appropriate tool to rotate the cam 40 through 180° back to the unlocked position of FIG. 4, which through the interaction of the eccentric cam portion 42 with the flange portions 32, 39 of the latching member or clip 30, cants or rotates the interlocking hook end portion of the latching member or clip back to the unlocked position withdrawing the hook end formation 33 from interlocking relation with the shoulders 15 bounding the pole slots 14 and realigning the hook formation 33 vertically with the protrusion or ear formations 27 whereby the formations 33 and 27 of the locking device can then be readily withdrawn from the slot 14.

I claim:

1. A locking device for assembling first and second tubular frame components of exhibit framework structures, wherein the first frame components have an interior cavity opening through an end thereof to receive the locking device nested therein and the second frame components have an undercut longitudinally elongated recess entered through an access slot communicating therewith bounded by flanking interior shoulder surfaces, the locking device comprising a substantially rectangular elongated bos-like housing sized to be received in said cavity of said first frame component and having an interior chamber bounded by opposite first and second flat vertical sidewalls paralleling a longitudinal midplane of the housing and narrow top and bottom horizontal walls in a use position thereof, said first sidewall throughout its length defining a flat planiform face spanning one side of said chamber, the housing having an open coupling end provided with protruding spaced apart coupling ear formations integral with the housing adjacent said top and bottom walls forming extrusions thereof flanking the opening of said coupling end, an elongated thin spring-metal interlocking latching member movably located in said housing having a generally panel-shaped body extending along said longitudinal midplane paralleling said sidewalls and substantially spanning the length of the housing and having a recurved hook formation on one end thereof spanning the space between and aligned with said ear formations, the latching member having an intermediate bend portion slidably bearing against the confronting flat planiform inner face defined by said first sidewall paralleling said mid-plane and an integral spring leg extending angularly therefrom in inclined relation to said midplane restrained against longitudinal movement relative to said second sidewall, said sidewalls and said spring leg and said bend portion forming coacting means for subjecting the bend portion to tensile bending moments flexibly distorting the adjacent portions of the latching member to displace said hook formation laterally from alignment with said ear formations into interlocking engagement with said shoulder surfaces responsive to longitudinal displacement of the latching member when said ear formations are inserted in said undercut recess, and a rotatable cam member journaled in said housing for moving the latching member longitudinally.

2. A locking device as defined in claim 1, wherein said spring leg of said latching member terminates in a free end portion defining a tab bent at an angle to the remainder of the spring leg, and said second sidewall having a slot therein receiving said tab and forming therewith a fulcrum about which said hook formation and adjoining portions of the latching member are flexibly distorted to displace the hook formation into interlocking position.

3. A locking device as defined in claim 2, wherein said body of said latching member includes an intermediate laterally off-set panel portion connected by bends at opposite ends thereof to the remainder of the body portion with the intermediate off-set panel portion extending generally parallel to said midplane and lying against said confronting inner surface of said first sidewall paralleling the same when the latching member is in a retracted unlocking position, one of said bends forming part of said intermediate bend portion coacting with said spring leg to flexibly distort the latching member.

4. A locking device as defined in claim 3, wherein said rotatable cam member includes a cylindrical portion concentric with an axis of rotation perpendicular to said midplane journaled for rotation about said axis in a circular opening in one of said sidewalls and having a non-round socket therein for receiving a tool bit to be rotated thereby, the cam member including a thin cam portion interposed between said latching member and said last mentioned sidewall having a generally oval periphery and a cam center eccentrically displaced relative to said axis of rotation, and said latching member having cam follower surfaces embracing said cam periphery for moving the latching member longitudinally to a first retracted position locating the hook formation in an unlocking position aligned with said ear formations and to a second projected position displacing the hook formation by said tensile bending moments to laterally displace relation relative to the ear formations for interlocking with said shoulder surfaces of said undercut recesses.

5. A locking device as defined in claim 3, wherein said rotatable cam member includes a cylindrical portion concentric with an axis of rotation perpendicular to said midplane journaled for rotation about said axis in a circular opening in one of said sidewalls and having a non-round socket therein for receiving a tool bit to be rotated thereby, the cam member including a thin cam portion interposed between said panel-shaped body of said latching member and said last mentioned sidewall having a generally oval periphery and a cam center eccentrically displaced relative to said axis of rotation, and said panel-shaped body of the latching member having short flange formations bent therefrom at diametrically opposite locations relative to said axis of rotation forming cam follower surfaces embracing said cam periphery for moving the latching member longitudinally to a first retracted position locating the hook formation in an unlocking position aligned with said ear formations and to a second projected position displacing the hook formation by said tensile bending moments to laterally displace relation relative to the ear formations for interlocking with said shoulder surfaces of said undercut recesses.

6. A locking device as defined in claim 2, wherein said rotatable cam member includes a cylindrical portion concentric with an axis of rotation perpendicular to said midplane journaled for rotation about said axis in a circular opening in one of said sidewalls and having a non-round socket therein for receiving a tool bit to be rotated thereby, the cam member including a thin cam portion interposed between said latching member and said last mentioned sidewall having a generally oval periphery and a cam center eccentrically displaced relative to said axis of rotation, and said latching member having cam follower surfaces embracing said cam surface for moving the latching member longitudinally to a first retracted position locating the hook formation in an unlocking position aligned with said ear formations and to a second projected position displacing the hook formation by said tensile bending moments to laterally displace relation relative to the ear formations for interlocking with said shoulder surfaces of said undercut recesses.

7. A locking device as defined in claim 1, wherein said body of said latching member includes an intermediate laterally off-set panel portion connected by bends at opposite ends thereof to the remainder of the body portion with the intermediate off-set panel portion extending generally parallel to said midplane and lying against said confronting inner surface of said first sidewall paralleling the same when the latching member is in a retracted unlocking position, one of said bends forming part of said intermediate bend portion coacting with said spring leg to flexibly distort the latching member.

8. A locking device as defined in claim 7, wherein said rotatable cam member includes a cylindrical portion concentric with an axis of rotation perpendicular to said midplane journaled for rotation about said axis in a circular opening in one of said sidewalls and having a non-round socket therein for receiving a tool bit to be rotated thereby, the cam member including a thin cam portion interposed between said latching member and said last mentioned side wall having a generally oval periphery and a cam center eccentrically displaced relative to said axis of rotation, and said latching member having cam follower surfaces embracing said cam periphery for moving the latching member longitudinally to a first retracted position locating the hook formation in an unlocking position aligned with said ear formations and to a second projected position displacing the hook formation by said tensile bending moments to laterally displace relation relative to the ear formations for interlocking with said shoulder surfaces of said undercut recesses.

9. A locking device as defined in claim 7, wherein said rotatable cam member includes a cylindrical portion concentric with an axis of rotation perpendicular to said midplane journaled for rotation about said axis in a circular opening in one of said sidewalls and having a non-round socket therein for receiving a tool bit to be rotated thereby, the cam member including a thin cam portion interposed between said panel-shaped body of said latching member and said last mentioned sidewall having a generally oval periphery and a cam center eccentrically displaced relative to said axis of rotation, and said panel-shaped body of the latching member having short flange formations bent therefrom at diametrically opposite locations relative to said axis of rotation forming cam follower surfaces embracing said cam periphery for moving the latching member longitudinally to a first retracted position locating the hook formation in an unlocking position aligned with said ear formations and to a second projected position displacing the hook formation by said tensile bending moments to laterally displace relation relative to the ear formations for interlocking with said shoulder surfaces of said undercut recesses.

10. A locking device as defined in claim 1, wherein said rotatable cam member includes a cylindrical portion concentric with an axis of rotation perpendicular to said midplane journaled for rotation about said axis in a circular opening in one of said sidewalls and having a non-round socket therein for receiving a tool bit to be rotated thereby, the cam member including a thin cam portion interposed between said latching member and said last mentioned sidewall having a generally oval periphery and a cam center eccentrically displaced relative to said axis of rotation, and said latching member having cam follower surfaces embracing said cam surface for moving the latching member longitudinally to a first retracted position locating the hook formation in an unlocking position aligned with said ear formations and to a second projected position displacing the hook formation by said tensile bending moments to laterally displaced relation to the ear formations for interlocking with said shoulder surfaces of said undercut recesses.

* * * * *